US008054167B2

(12) United States Patent
Yasuhara et al.

(10) Patent No.: US 8,054,167 B2
(45) Date of Patent: Nov. 8, 2011

(54) ONBOARD VEHICLE INFORMATION NOTIFYING APPARATUS, INFORMATION PROVIDING SYSTEM, AND INFORMATION NOTIFYING METHOD

(75) Inventors: Shinji Yasuhara, Atsugi (JP); Masayuki Ohsugi, Sagamihara (JP); Tsuneyuki Watanabe, Isehara (JP); Maki Ueda, Yamato (JP); Yasuhisa Nakamura, Machida (JP); Daisuke Nakata, Tokyo (JP); Yasunori Kondo, Toride (JP); Takuya Hashimoto, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 459 days.

(21) Appl. No.: 12/237,661

(22) Filed: Sep. 25, 2008

(65) Prior Publication Data

US 2009/0085774 A1 Apr. 2, 2009

(30) Foreign Application Priority Data

Sep. 28, 2007 (JP) ................................ 2007-253449

(51) Int. Cl.
*B60Q 1/00* (2006.01)

(52) U.S. Cl. ... 340/435; 340/903; 340/961; 340/995.13; 701/301

(58) Field of Classification Search .................. 340/903, 340/435, 961, 995.1, 995.12, 995.13; 701/301
See application file for complete search history.

(56) References Cited

U.S. PATENT DOCUMENTS 4,835,537 A * 5/1989 Manion .......................... 342/30
7,099,776 B2 * 8/2006 King et al. .................... 701/213
7,209,831 B2 * 4/2007 Hilliard et al. ................ 701/301
7,865,309 B2 * 1/2011 Taylor .......................... 701/301
2007/0279250 A1 * 12/2007 Kume et al. ................... 340/903

FOREIGN PATENT DOCUMENTS

JP 2004-227412 8/2004

* cited by examiner

*Primary Examiner* — Brent Swarthout
(74) *Attorney, Agent, or Firm* — Global IP Counselors, LLP

(57) ABSTRACT

An onboard vehicle information notifying apparatus is proved with a moving body position acquiring section, an information acquiring section, an information providing zone setting section and an information notifying section. The moving body position acquiring section acquires a moving body position for at least one moving body existing in a vicinity of a host vehicle. The information acquiring section acquires an advancement speed and an advancement direction of the host vehicle, and a prescribed movement speed of the moving body. The information providing zone setting section sets an information providing zone within which existence of the moving body should be reported, based on information acquired by the information acquiring section. The information notifying section reports the existence of the moving body when the position of the moving body acquired by the moving body position acquiring section exists within the information providing zone set by the information providing zone setting section.

18 Claims, 13 Drawing Sheets

ONBOARD VEHICLE INFORMATION NOTIFYING APPARATUS, INFORMATION PROVIDING SYSTEM, AND INFORMATION NOTIFYING METHOD

CROSS-REFERENCE TO RELATED APPLICATIONS

This application claims priority to Japanese Patent Application No. 2007-253449, filed on Sep. 28, 2007. The entire disclosure of Japanese Patent Application No. 2007-253449 is hereby incorporated herein by reference.

BACKGROUND OF THE INVENTION

1. Field of the Invention

The present invention generally relates to an onboard vehicle information notifying apparatus for notifying a driver of a host vehicle regarding an existence of a pedestrian or other moving body in a vicinity surrounding the vehicle.

2. Background Information

Japanese Laid-Open Patent Publication No. 2004-227412 describes a known technology for notifying a driver of a host vehicle regarding a moving bodies in a vicinity surrounding the vehicle. The vehicle driving assistance apparatus presented in Japanese Laid-Open Patent Publication No. 2004-227412 computes a relative positional relationship between the host vehicle and each of the moving bodies existing in a region surrounding the vehicle based on information received from the moving bodies, and then report information regarding the moving bodies.

SUMMARY OF THE INVENTION

It has been discovered that in the vehicle driving assistance apparatus described above, the vehicle driving assistance apparatus receives information from all of the moving bodies existing in the vicinity of the vehicle. Thus, when there are numerous other moving bodies, it is necessary to receive information from all of the moving bodies and to compute the relative positional relationship between the vehicle and each of the moving bodies. Consequently, with the vehicle driving assistance apparatus described above, the amount of computer processing that must be executed at the host vehicle in order to determine if the driver should be notified of the existence of a moving body can become very large.

The present invention was conceived in view of this drawback of the apparatus described above. One object is to provide an onboard vehicle information notifying apparatus, an information providing system, and an information notifying method that can reduce the computer processing load born onboard the vehicle in order to report information regarding another moving body.

An apparatus in accordance with one aspect, an onboard vehicle information notifying apparatus is provided that basically comprises a moving body position acquiring section, an information acquiring section, an information providing zone setting section and an information notifying section. The moving body position acquiring section is configured to acquire a moving body position for at least one moving body existing in a vicinity of a host vehicle equipped with the vehicle information notifying apparatus. The information acquiring section is configured to acquire an advancement speed and an advancement direction of the host vehicle, and a prescribed movement speed of the moving body. The information providing zone setting section is configured to set an information providing zone within which existence of the moving body should be reported, based on information acquired by the information acquiring section. The information notifying section is configured to report the existence of the moving body when the position of the moving body acquired by the moving body position acquiring section exists within the information providing zone set by the information providing zone setting section.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
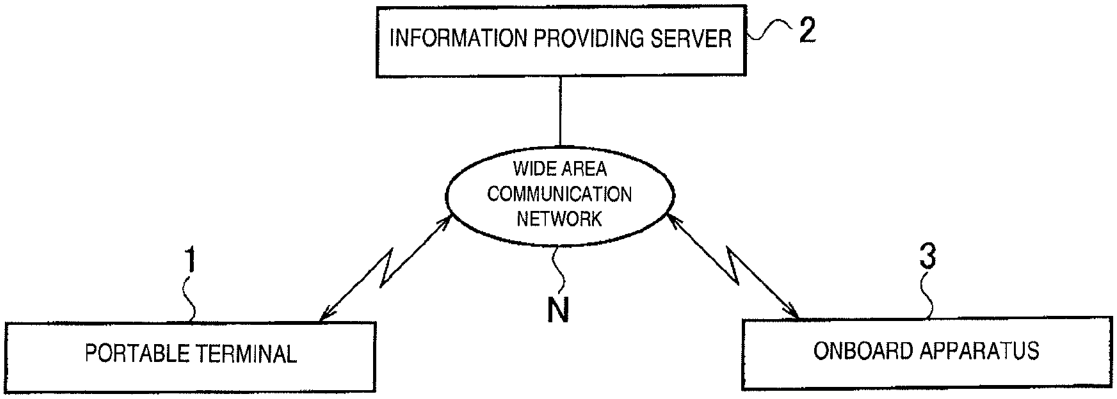
FIG. 1 is a block diagram showing basic components of an information providing system in accordance with one embodiment.

Referring initially to FIG. 1, an information providing system illustrated in accordance with a first embodiment. The information providing system is intended to alert a driver of a host vehicle of the existence moving bodies (e.g., pedestrians, people riding bicycles, other vehicles) on a road in order to urge the driver to pay attention to the moving bodies. Thus, the term "moving body" is not limited to a pedestrian. More specifically, the term "moving body" any moving object that includes an ability to communicate with the host vehicle directly, or indirectly.

Thus, basically in this information providing system, a portable terminal 1 possessed by a moving body (e.g., pedestrians, people riding bicycles, other vehicles) sends information indicating a position of the portable terminal 1 to a remote (off-board) information providing server 2. Then, the information providing server 2 sends information necessary for reporting the existence of the moving body (e.g., pedestrians, people riding bicycles, other vehicles) to an onboard apparatus 3 of the host vehicle. The onboard apparatus 3 constitutes a vehicle information notifying apparatus, and serves to report the existence of the moving body (e.g., pedestrians, people riding bicycles, other vehicles) to the driver of the host vehicle. The exchange of information between the portable terminal 1 and the information providing server 2 and the exchange of information between the information providing server 2 and the onboard apparatus 3 is conducted through a wide area communication network N, e.g., a mobile communication network or a wired public communication network, that includes general purpose communication circuits. Although FIG. 1 shows only one portable terminal 1 and one onboard apparatus 3, the information providing server 2 can conduct communication among pluralities of portable terminals 1 and onboard apparatuses 3.

Figure 2:
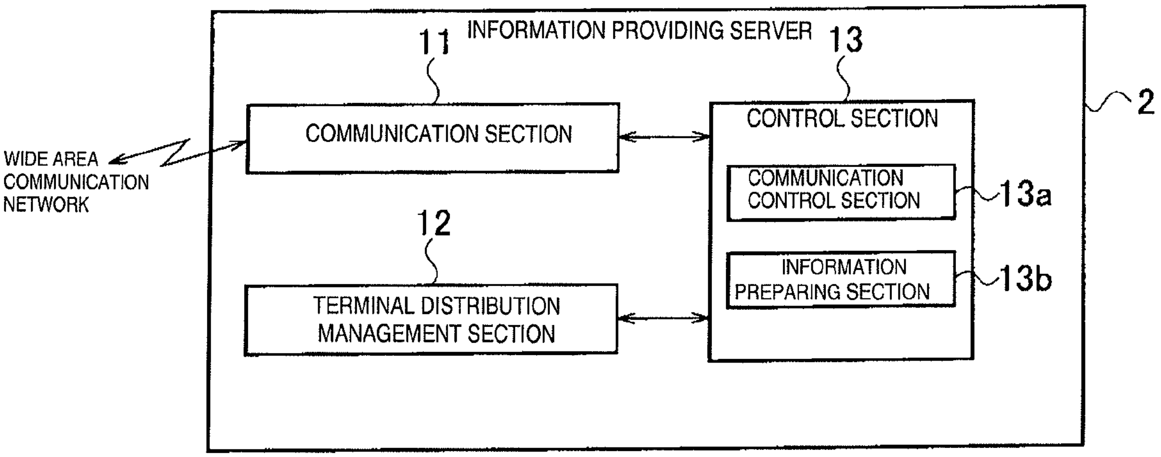
FIG. 2 is a block diagram showing basic components of an information providing server of the information providing system illustrated in FIG. 1.

As seen in FIG. 2, the information providing server 2 basically includes a communication section 11, a terminal distribution management section 12 and a control section 13. The communication section 11 is configured to exchange information between the portable terminal 1 and the onboard apparatus 3 through the wide area communication network N. The terminal distribution management section 12 is configured to manage a distribution of portable terminals 1. The control section 13 is configured to control the operation of the information providing server 2 as a whole. The information providing server 2 is a microcomputer that includes a central processing unit, an input interface circuit, an output interface circuit, and storage devices such as a ROM (Read Only Memory) device and a RAM (Random Access Memory) device. FIG. 2 is a block diagram illustrating the functions of the information providing server 2 as separate blocks or sections. These blocks or sections 11, 12 and 13 are formed of conventional hardware and/or software.

The communication section 11 also has an antenna circuit configured to send and receive wireless signals to and from the wide area communication network N, a transmission circuit configured to transmit wireless signals to the wide area communication network N, and a receiving circuit configured to process wireless signals received from the wide area communication network N. The communication section 11 serves to convert received wireless signals into digital information and supply the digital information to the control section 13. The communication section 11 also serves to generate a wireless signal when it receives digital information to be transmitted to the wide area communication network N from the control section 13. More specifically, the communication section 11 receives position information transmitted from the portable terminal 1 through the wide area communication network N. The terminal position information sent from the portable terminal 1 is transmitted by the portable terminal 1 once per prescribed communication cycle period.

The communication section 11 is configured to receive information transmission requests sent from the onboard apparatus 3 through the wide area communication network N. These requests include a request for transmission of position information and map information and request for transmission of simple map data (described later) that is used in order report the existence of the portable terminal 1, i.e., the existence of a moving body, to a driver of the vehicle in which the onboard apparatus 3 is installed. The operation of the communication section 11 is controlled by a communication control section 13*a* of the control section 13.

The communication control is accomplished by the communication control section 13*a* controlling the communication section 11 to establish and break a communication connection between the information providing server 2 and the portable terminal 1. When the onboard apparatus 3 starts up, the control processing necessary for establishing a communication connection between the onboard apparatus 3 and the information providing server 2 is also accomplished by the communication control section 13*a* controlling the communication section 11.

The terminal distribution management section 12 is configured to store position information sent from a plurality of the portable terminals 1 (terminal position information) and position information sent from a plurality of the onboard apparatuses 3 (host vehicle position information). The terminal position information and the host vehicle position information are both expressed in terms of longitude and latitude. The terminal distribution management section 12 stores terminal position information expressing the positions of the portable terminals 1 for which a communication connection has been established with respect to the communication section 11, and the host vehicle position information expressing the positions of the onboard apparatuses 3 for which a communication connection has been established with respect to the communication section 11. The terminal distribution management section 12 creates distribution data that distributes the terminal position information and the host vehicle position information on the simple map data (described later). Thus, the terminal distribution management section 12 serves as a map creating device.

The terminal distribution management section 12 executes processing to update the simple map data at each prescribed cycle period when terminal position information is sent from the portable terminals 1 and processing to update the simple map data at each prescribed cycle period when the host vehicle position information is sent from the onboard apparatuses 3. The simple map data updated by the terminal distribution management section 12 is processed by an information preparing section 13*b* into information tailored to be provided to the onboard apparatus 3 when the simple map data is sent to the onboard apparatus 3. The communication control section 13*a* controls the communication section 11 to accomplish transmitting the information to the onboard apparatus 3 through the wide area communication network N.

The information preparing section 13*b* executes processing to extract a portion of the distribution data created by the terminal distribution management section 12 and creates the simple map data to be sent to the onboard apparatuses 3. When, for example, the onboard apparatus 3 is started, and/or on a periodic basis, an information transmission request is sent to the information providing server 2 requesting information for ascertaining the existence of the portable terminals 1 in the vicinity of the onboard apparatus 3. The information transmission request includes the host vehicle position information from the onboard apparatus 3. When the information transmission request is received, the information preparing section 13*b* creates simple map data expressing a distribution of portable terminals 1 centered on the host vehicle position information. The communication control section 13*a* then controls the communication section 11 so as to transmit the simple map data to the onboard apparatus 3 that sent the information transmission request. In this way, the information providing server 2 can report the existence of a moving body in the vicinity of the host vehicle in which the onboard apparatus 3 is installed to a driver of the host vehicle based on the host vehicle position information obtained from the onboard apparatus 3.

Figure 5:
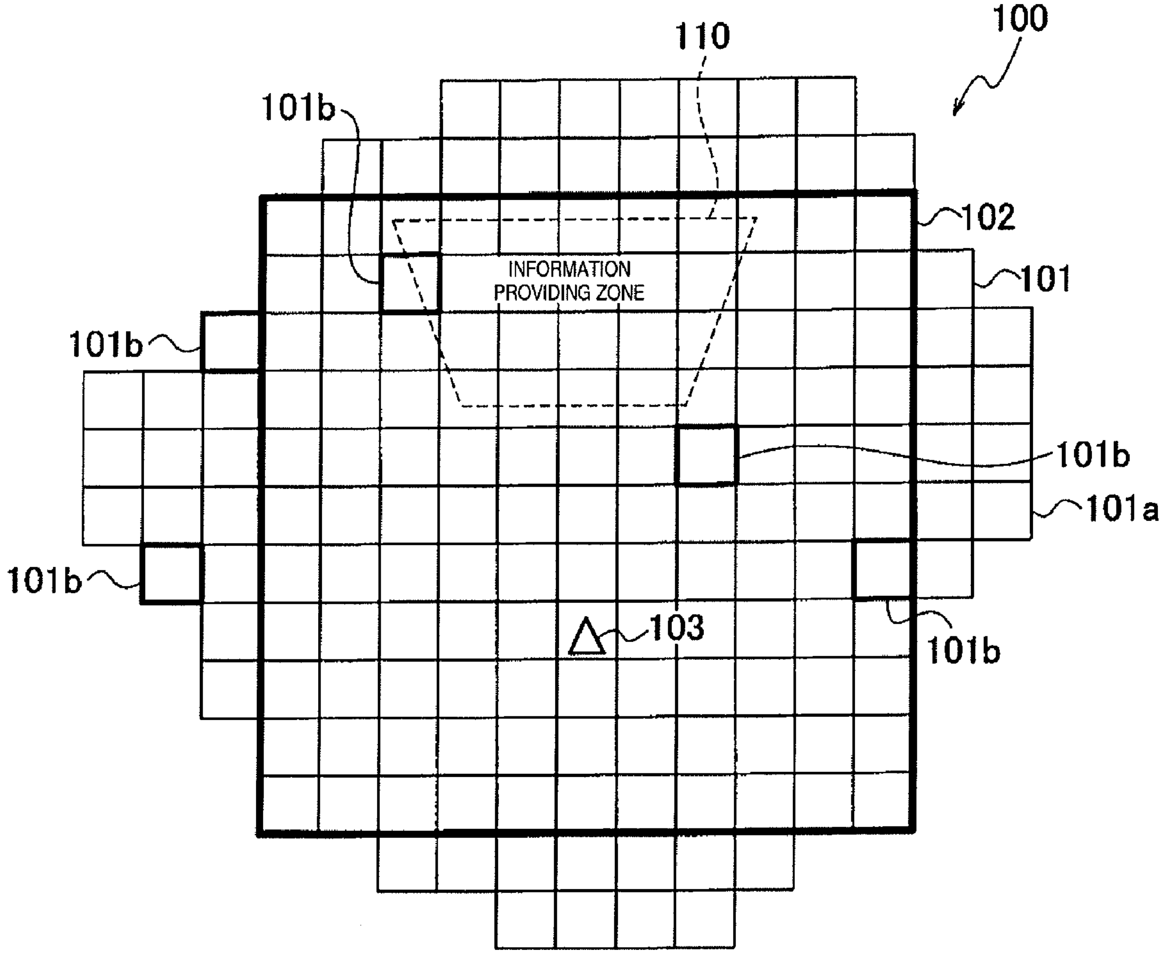
FIG. 5 is a diagram illustrating simple map data used in the information providing system illustrated in FIG. 1.

As shown in FIG. 5, the simple map data 100 is divided into a grid made up of unit regions having a prescribed area. Each unit region 101 is assumed to have the shape of a square whose sides are each several meters to several tens of meters long. It is also acceptable for the shape of the unit region 101 to be hexagonal or some other shape. The simple map data 100 is map data to which has been added notification determination information that indicates if each of the unit region s101 is a notification unnecessary region 101*a* expressing that the portable terminal 1 does not exist, or a notification necessary region 101*b* expressing that the portable terminal 1 does exist. The notification unnecessary regions 101*a* are regions in a vicinity of the onboard apparatus 3 in which a moving body possessing a portable terminal 1 does not exist. The notification unnecessary regions 101*b* are regions in a vicinity of the onboard apparatus 3 in which a moving body possessing a portable terminal 1 does exist. The simple map data 100 includes a host vehicle position 103 identified based on the host vehicle position information sent from the onboard apparatus 3. A set of simple map data 102 having a prescribed size, e.g., a radius of several kilometers centered generally on the host vehicle position 103, is extracted from the simple map data 100. The simple map data 102 is transmitted from the information providing server 2 to the onboard apparatus 3.

Figure 3:
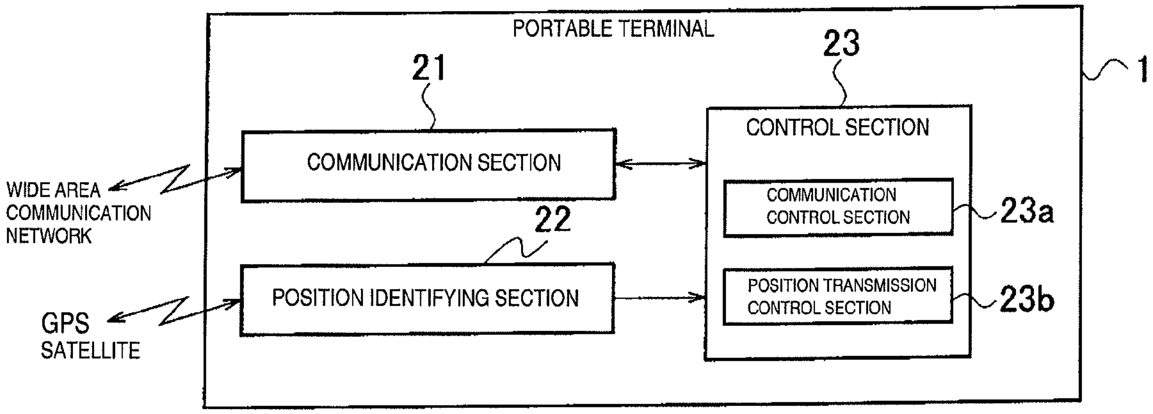
FIG. 3 is a block diagram showing basic components of a portable terminal of the information providing system illustrated in FIG. 1.

As shown in FIG. 3, the portable terminal 1 includes a communication section 21, a position identifying section 22 and a control section 23. The communication section 21 is configured to exchange information with the information providing server 2 through the wide area communication network N. The position identifying section 22 is configured to identify a position of the portable terminal 1 itself. The control section 23 is configured to control the overall operation of the portable terminal 1. The portable terminal 1 is a microcomputer that includes a central processing unit, an input interface circuit, an output interface circuit, and storage devices such as a ROM (Read Only Memory) device and a RAM (Random Access Memory) device. FIG. 3 is a block diagram illustrating the functions of the portable terminal as separate blocks or sections. These blocks or sections 21, 22 and 23 are formed of conventional hardware and/or software. The control section 23 is configured to execute a program stored in a memory (not shown) and, thereby, execute the functions of a communication control section 23*a* configured to control communication between the portable terminal 1 and the information providing server 2 and a position transmission control section 23*b* configured to control the transmission of terminal position information.

The communication section 21 has an antenna circuit configured to send and receive wireless signals to and from the wide area communication network N, a transmission circuit configured to transmit wireless signals to the wide area communication network N, and a receiving circuit configured to process wireless signals received from the wide area communication network N. The communication section 21 serves to convert received wireless signals into digital information and supply the digital information to the control section 23. The communication section 21 also serves to generate a wireless signal when the communication section 21 receives digital information to be transmitted to the wide area communication network N from the control section 23.

More specifically, the communication section 21 sends terminal position information for the portable terminal 1 to the information providing server 2 through the wide area communication network N. The operation of the communication section 21 is controlled by the communication control section 23*a* of the control section 23. The communication control is accomplished by the communication control section 23*a* controlling the communication section 21 to establish and break a communication connection between the information providing server 2 and the portable terminal 1.

The position identifying section 22 receives a signal transmitted from a GPS satellite and generates position information specifying a position of the portable terminal 1. The terminal position information is transmitted to the information providing server 2 once per prescribed communication cycle period by control executed by the position transmission control section 23*b*.

Figure 4:
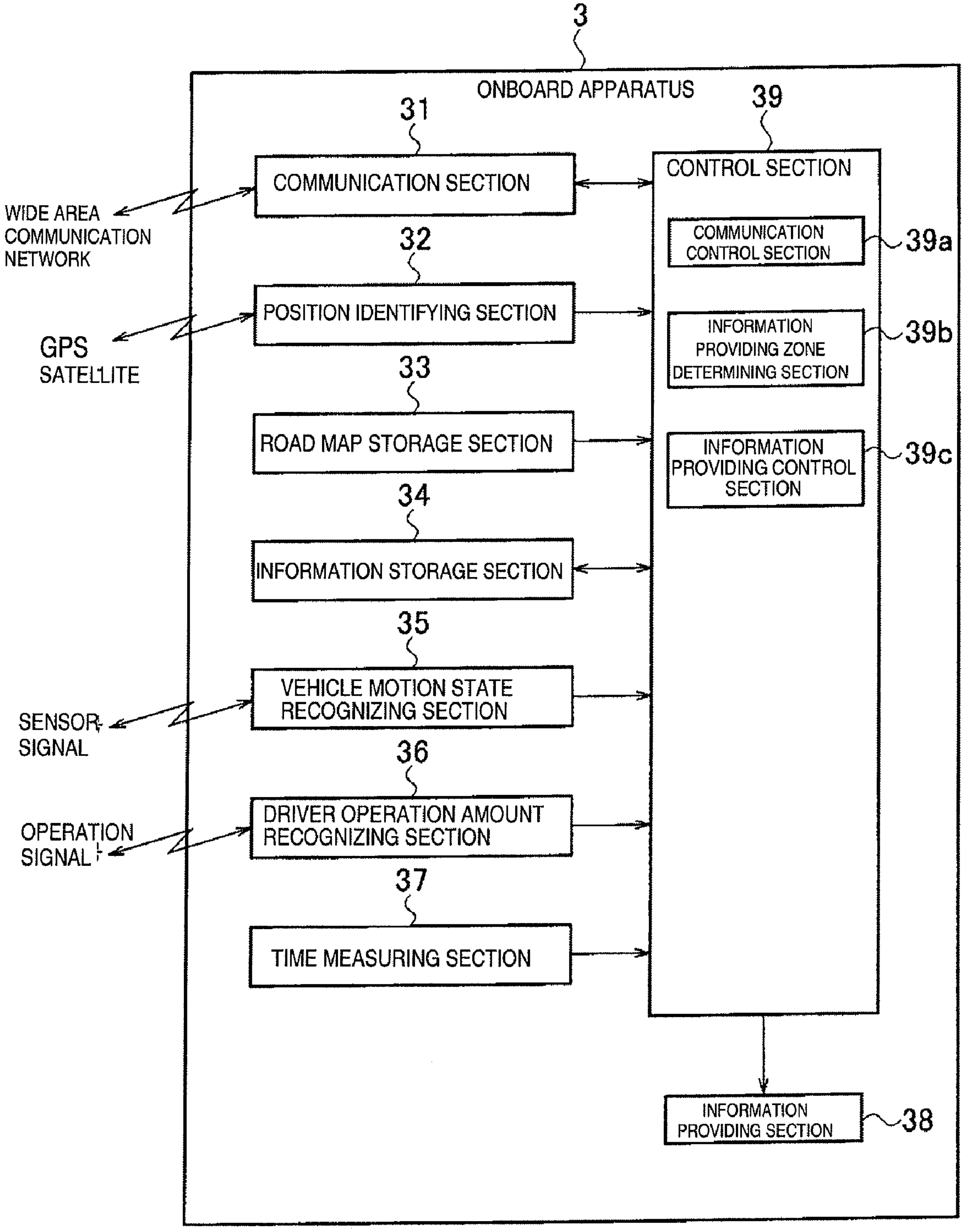
FIG. 4 is a block diagram showing basic components of an onboard apparatus of the information providing system illustrated in FIG. 1.

As shown in FIG. 4, an onboard apparatus 3 includes a communication section 31, a position identifying section 32 a road map storage section 33, an information storage section 34, a vehicle motion state recognizing section 35, a driver operation amount recognizing section 36, a time measuring section 37, an information providing section 38 and a control section 39. The communication section 31 is configured to send and receive information to and from the information providing server 2 through the wide area communication network N. The position identifying section 32 is configured to identify a position of the onboard apparatus 3. The road map storage section 33 is configured to store road maps. The information storage section 34 is configured to store various information as discussed below. The vehicle motion state recognizing section 35 is configured to recognize a vehicle motion state. The driver operation amount recognizing section 36 is configured to recognize a driver operation. The time measuring section 37 is configured to measure time. The information providing section 38 is configured to provide various information as discussed below. The control section 39 is configured to control operation of the onboard apparatus 3 as a whole. The onboard apparatus 3 a microcomputer that includes a central processing unit, an input interface circuit, an output interface circuit, and storage devices such as a ROM (Read Only Memory) device and a RAM (Random Access Memory) device. FIG. 4 is a block diagram illustrating the functions of the onboard apparatus 3 as separate blocks. These blocks or sections 31 to 39 are formed of conventional hardware and/or software.

The communication section 31 has an antenna circuit configured to send and receive wireless signals to and from the wide area communication network N, a transmission circuit configured to transmit wireless signals to the wide area communication network N, and a receiving circuit configured to process wireless signals received from the wide area communication network N. The communication section 31 serves to convert received wireless signals into digital information and supply the digital information to the control section 39. The communication section 31 also serves to generate a wireless signal when the communication section 31 receives digital information to be transmitted to the wide area communication network N from the control section 39.

More specifically, the communication section 31 is configured to send the host vehicle position information to the information providing server 2 through the wide area communication network N and to receive simple map data 102 from the information providing server 2. The operation of the communication section 31 is controlled by a communication control section 39*a* of the control section 39. The communication control is accomplished by the control section 39 controlling the communication section 31 to establish and break a communication connection between the onboard apparatus 3 and the information providing server 2.

The position identifying section 32 receives a signal transmitted from a GPS satellite and generates the host vehicle position information specifying a position of the host vehicle in which the onboard apparatus 3 is installed. The host vehicle position information is supplied to the control section 39 and transmitted to the information providing server 2 through the communication section 31 once per prescribed communication cycle period. The host vehicle position information is transmitted together with a request signal that the onboard apparatus 3 sends to the information processing server 2 requesting a transmission of simple map data 102.

The road map storage section 33 stores detailed map data that includes link data and node data expressing roads and intersections and records points on a map as longitude and latitude information. More specifically, the detailed map data of the road map storage section 33 includes information regarding the shapes of intersections, the curvatures of roads, and the types of roads (e.g., expressways, bypasses, and general highways), and the information is correlated to longitude and latitude information expressing points on the map. The road map storage section 33 also stores information specifying recommended routes for the host vehicle to travel on.

It is acceptable for the detailed map data stored in the road map storage section 33 to be detailed map data covering an entire country that is stored on a large capacity storage medium or detailed map data downloaded from a map storage server (not shown). It is also acceptable for the detailed map data stored in the road map storage section 33 to be detailed map data of an area including a recommended route for the vehicle to travel along that has been computed by an onboard navigation apparatus (not shown) or a server apparatus (not shown) having a navigation function.

The information storage section 34 is configured to temporarily store simple map data 102 received from the information providing server 2. It is acceptable for the information storage section 34 to also store such information as the number of times the information providing section has reported the existence of a pedestrian during a period from when the vehicle was started until the vehicle is stopped, a history of the number of times pedestrians were reported, and the amount of time that has elapsed since the existence of a pedestrian was reported. Applications for information other than simple map data 102 stored in the information storage section 34 will be explained later.

The information storage section 34 also stores a prescribed farthest zone distance and a shortest distance from the host vehicle that define an information providing zone within which existence of a moving body should be reported (which is necessary to set an information providing zone within which it is necessary to report the existence of a moving body as will be described later) and a prescribed movement speed of the moving body.

The vehicle motion state recognizing section 35 acquires advancement information (e.g., an advancement speed of the host vehicle and an advancement direction of the host vehicle) and outputs the same to the control section 39. Although the advancement speed and the advancement direction of the host vehicle are mentioned in this description of the onboard apparatus 3 as the host vehicle motion parameters for modifying the information providing zone (described later), it is acceptable to acquire other parameters so long as the parameters indicate a state of motion of the host vehicle on which to base modification of the information providing zone.

The driver operation amount recognizing section 36 is configured to acquire steering angle information generated by a steering operation or turn signal operation information when a driver will turn the vehicle left or right, brake operation information, and such driving operation information as setting a shift position of the vehicle to a reverse position (R) or a park position (P). The driver operation amount recognizing section 36 outputs the acquired information to the control section 39.

The time measuring section 37 generates time information used by the control section 39 for the execution of computer processing. The control section 39 reads in the time information. By referring to the time information generated by the time measuring section 37, the control section 39 controls the timing of the computer processing executed by an information providing zone determining section 39*b* in order to determine the information providing zone and the computer processing executed by an information providing control section 39*c* in order to report the existence of a pedestrian.

The information providing section 38 includes a display apparatus that a driver can view or a sound emitting that emits a sound to a driver. It is acceptable for the information providing section 38 to include an input device configured to detect an operation performed by a driver or other person in order to display information.

The control section 39 is configured to execute a program stored in a memory (not shown) and, thereby, execute the functions of the communication control section 39*a*, the information providing zone determining section 39*b*, and the information providing control section 39*c*.

The information providing zone determining section 39*b* is configured to set the information providing zone in which existence of a moving body should be reported. The information providing zone determining section 39*b* sets the information providing zone based on the advancement speed and advancement direction of the host vehicle acquired by the vehicle motion state recognizing section 35, the prescribed farthest zone distance and shortest distance from the vehicle stored in the information storage section 34 for setting the information providing zone, and the prescribed movement speed of a pedestrian stored in the information storage section 34. For example, as shown in FIG. 5, the information providing zone 110 is set to a position separate from the host vehicle position 103. The information providing zone 110 is sized to include a plurality of unit regions 101. The information providing zone 110 is preferably shaped like a trapezoid having a shorter bottom base side closer to the host vehicle position 103 and a longer top base side farther from the host vehicle position 103. The information providing zone determining section 39*b* is configured to compute a shape of the information providing zone 110 in response to receiving vehicle position information sent from the onboard apparatus 3 by the communication section 31. The processing executed by the information providing zone determining section 39*b* in order to set the information providing zone 110 will be described later.

The information providing control section 39*c* refers to the simple map data 100 stored in the information storage section 34 and acquires positions of pedestrians existing in a vicinity of the host vehicle (notification necessary regions 101*b*). If the position of a moving body is inside the information providing zone 110 set by the information providing zone determining section 39*b*, then the information providing control section 39*c* executes control such that the information providing section 38 reports that the moving body exists. More specifically, the information providing control section 39*c* reports the existence of a moving body through the information providing section 38 when the information providing zone 110 overlaps with a notification required region 101*b* contained in the simple map data 100 and does not report the existence of a pedestrian when the information providing region 110 only overlaps with notification unnecessary regions 101*a*.

Thus, in this information providing system, the portable terminals 1 send the terminal position information to the information providing server 2 and the information providing server 2 creates distribution data expressing a distribution of the terminal position information. As a result, with this information providing system, when the onboard apparatus 3 sends vehicle position information to the information providing server 2, the information providing server 2 can provide distribution data to the onboard apparatus 3 such that a position of a moving body possessing the portable terminal 1 can be reported to a driver of the vehicle in which the onboard apparatus 3 is installed.

Figure 6:
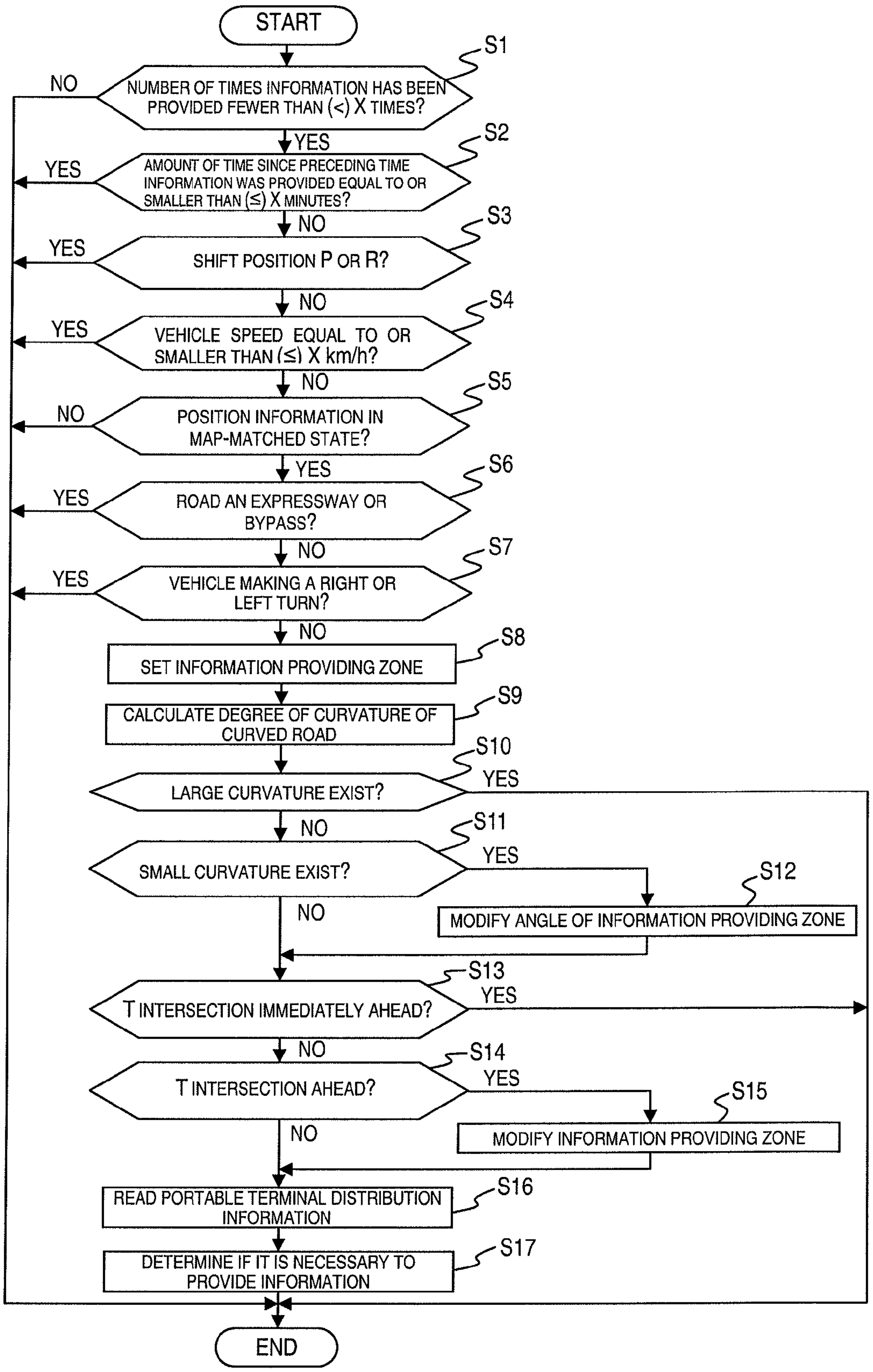
FIG. 6 is a flowchart showing the control processing steps executed in the information providing system illustrated in FIG. 1 in order to set an information providing zone and report the existence of a moving body (e.g., a pedestrian)

The processing steps executed by an onboard apparatus 3 in the information providing system configured as described above in order to notify a driver of the host vehicle that a moving body exists in a vicinity of the vehicle will now be explained with reference to the flowchart shown in FIG. 6. The processing shown in FIG. 6 is executed once per prescribed processing cycle period, e.g., once every several hundred milliseconds.

In step S1, the control section 39 checks the total number of times the existence of a pedestrian has been reported since the engine of the vehicle was started and determines if the current number of times is smaller than a preset maximum number of times. The number of times a moving body has been reported is counted and stored in the information storage section 34 of the onboard apparatus 3. The maximum number of times is a prescribed value set based on experience or the like and corresponds to a large number of moving body reports that could possibly become a nuisance to the driver and weaken the effect of the reports. If the number of times the existence of a moving body has been reported is smaller than the maximum number of times, then the control section 39 proceeds to step S2. Meanwhile, if the number of times the existence of a pedestrian has been reported is equal to or larger than the maximum number of times, then the control section 39 stops the process of setting the information providing zone 110 and ends the control sequence without executing a report.

In step S2, the control section 39 determines if the amount of time that has elapsed since the preceding time the existence of a moving body was reported (which time is stored in the information storage section 34 of the onboard apparatus 3) is equal to or smaller than a preset minimum amount of time (X minutes). In this embodiment, time information indicating the time when the preceding report occurred as measured by the time measuring section 37 is stored in the information storage section 34. The control section 39 then calculates the amount of time that has elapsed since the time of the preceding report based on the stored time information and current time information. The minimum amount of time is a prescribed value set based on experience or the like and corresponds to a high frequency of moving body reports that could possibly become a nuisance to the driver and weaken the effect of the reports. If the amount of time elapsed since the preceding report is larger than the minimum amount of time, then the control section 39 proceeds to step S3. Meanwhile, if the amount of time elapsed since the preceding report is equal to or smaller than the minimum amount of time, then the control section 39 stops the process of setting the information providing zone 110 and ends the control sequence without executing a report.

In step S3, the control section 39 determines if the shift position acquired by the driver operation amount recognizing section 36 is the reverse position (R) or the park position (P). In other words, in step S3, the control section 39 determines if a driving operation for stopping the vehicle is detected. If the shift position is the reverse position or the park position, i.e., if the vehicle is in a store parking lot or other place where it is not necessary to report the existence of a pedestrian to the driver, then the control section 39 ends the control sequence. Meanwhile, if the shift position is in neither the reverse position nor the park position, then the control section 39 proceeds to step S4.

In step S4, the control section 39 determines if the speed of the host vehicle acquired by the vehicle motion state recognizing section 35 is equal to or smaller than a prescribed value (X km/hour). The prescribed value is set in advance based on experience or the like to a vehicle speed appropriate for detecting if the vehicle is about to come to a stop. If the vehicle speed is equal to or below the prescribed value, then the control section 39 ends the control sequence because it can be assumed that it is not necessary to report the existence of a moving body to the driver. Meanwhile, if the vehicle speed is not equal to or below the prescribed value, then the control section 39 proceeds to step S5.

In step S5, the control section 39 determines if the host vehicle position information calculated by the position identifying section 32 is in a revised map-matched state by referring to the detailed map data stored in the road map storage section 33. If it determines that the host vehicle position information has not been matched to the detailed map data, then the control section 39 determines that an accurate information providing zone 110 cannot be set and ends the control sequence. If it determines that the host vehicle position information is in a map-matched state, then the control section 39 proceeds to step S6.

In step S6, the control section 39 reads road type information indicating the type of road on which the host vehicle is traveling from the road map storage section 33 based on the host vehicle position information and the detailed map data. Then, by determining if the type of road on which the vehicle is currently traveling is an expressway or a bypass, the control section 39 determines if the vehicle is traveling on a road where moving bodies do not exist. If the vehicle is determined to be traveling on an expressway or a bypass, then the control section 39 ends the control sequence because it can be assumed that it is not necessary to report the existence of a moving body to the driver. If the vehicle is determined not to be traveling on an expressway or a bypass, then the control section 39 proceeds to step S7.

In step S7, the control section 39 determines if the vehicle is in the process of turning left or right or is highly likely to turn left or right very soon based on brake information, turn signal information, and steering angle information detected by the driver operation amount recognizing section 36.

The control section 39 can determine that the vehicle is in the midst of turning left or right when the steering angle is larger than a prescribed steering angle Rs set to a value at which it can be determined that the vehicle is turning left or right. Absolute values are used for the steering angle detected by the driver operation amount recognizing section 36 and the prescribed steering angle Rs such that both left turns and right turns can be detected regardless of the actual direction. The control section 39 determines that the vehicle is highly likely to turn right or left soon when it detects a brake operation and a turn signal operation. If the control section 39 determines either that the vehicle is in the midst of a right or left turn or that the vehicle is highly likely to turn right or left, then the control section 39 ends the control sequence because it cannot set an accurate information providing zone 110. Conversely, if it determines that the vehicle is not making a right or left turn and is not highly likely to make a right or left turn, then the control section 39 proceeds to step S8.

In step S8, the information providing zone determining section 39*b* sets an information providing zone 110 within which an existence of a moving body should be reported. The information providing zone determining section 39*b* sets the information providing zone 110 using the speed of the host vehicle acquired by the vehicle motion state recognizing section 35 and the prescribed movement speed of a moving body and the time to contact (TTC) information stored in the information storage section 34. The information providing zone determining section 39*b* then adjusts the information providing zone 110.

More specifically, the information providing zone determining section 39*b* uses the following four parameters: the host vehicle speed Vv (km/h) of the host vehicle, which is a variable value; an anticipated or assumed movement speed Vp (km/h) of a moving body that is a constant; an information providing time TTC_A (seconds) indicating a prescribed maximum length of time (constant) from the host vehicle that defines the information providing zone 110 in which the existence of a moving body should be reported; and an information providing time TTC_B (seconds) indicating a prescribed minimum length of time (constant) from the host vehicle that defines the information providing zone 110 in which the existence of a moving body should be reported.

The information providing time TTC_A is a threshold value for the side of the information providing zone 110 that is farther from the host vehicle position 103. The information providing time TTC_A is set to an amount of time at which a moving body will be too far away from the vehicle for a driver to experience any useful effect even if the existence of the moving body is reported or too far for the driver to be able to recognize the moving body as an obstacle.

The information providing time TTC_B is a threshold value for the closer side of the information providing zone 110. The information providing time TTC_B is set to an amount of time at which it is believed that a moving body would be to close to the host vehicle for a driver to perform an appropriate driving operation with respect to the moving body even if the existence of the moving body was reported and the driver started an operation to decelerate the host vehicle.

Figure 7:
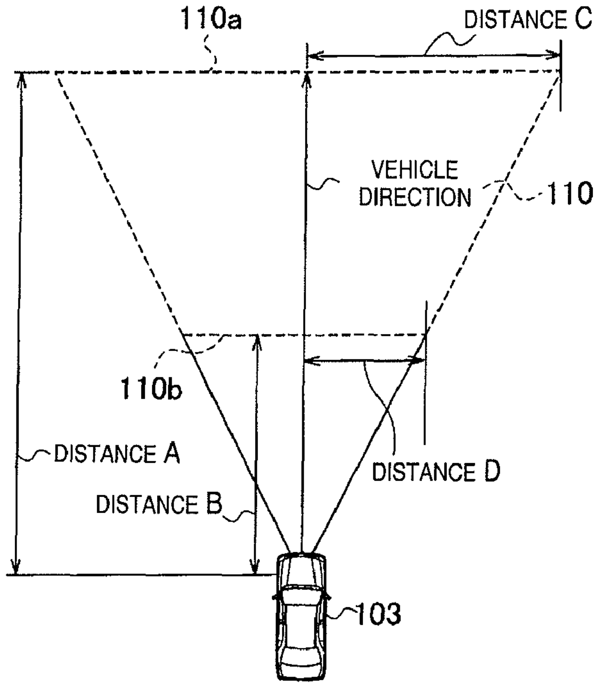
FIG. 7 illustrates how the information providing zone is set by the onboard apparatus in the information providing system illustrated in FIG. 1.

Using these parameters, the information providing zone determining section 39*b* computes a farthest zone distance A of the information providing zone 110 from the host vehicle position 103 and a closest zone distance B of the information providing zone 110 from the host vehicle position 103, as shown in FIG. 7. The farthest zone distance A and the closest zone distance B are calculated with respect to the advancement direction of the host vehicle position 103 using the equations shown below.

$$\text{Farthest zone distance } A = Vv \times TTC\_A$$

$$\text{Closest zone distance } B = Vv \times TTC\_B$$

The information providing zone determining section 39*b* then sets a top base distance C and a bottom base distance D that are measured to the left and right from a centerline corresponding to the advancement direction of the host vehicle. The top base distance C and the bottom base distance D are computed using the equations below.

$$\text{Top base distance } C = Vp \times TTC\_A$$

$$\text{Top base distance } D = Vp \times TTC\_B$$

Based on these calculations, the information providing zone determining section 39*b* can set a farthest line 110*a* of the information providing zone 110*d* a closest line 110*b* of the information providing zone 110. The farthest line 110*a* has a length equal to twice the top base distance C and positioned so as to be centered on the advancement direction of the host vehicle at a distance equal to the farthest zone distance A from the host vehicle position 103. The closest line 110*b* has a length equal to twice the bottom base distance D and positioned so as to be centered on the advancement direction of the host vehicle at a distance equal to the closest zone distance B from the host vehicle position 103. The information providing zone determining section 39*b* can then set the information providing zone 110 to be a trapezoidal region enclosed by the farthest line 110*a*, the closest line 110*b*, a line segment joining the right end (as viewed from the host vehicle position 103) of the closest line 110*b* to the right end of the farthest line 110*a*, and a line segment joining the left end (as viewed from the host vehicle position 103) of the closest line 110*b* to the left end of the farthest line 110*a*.

Next, the information providing zone determining section 39*b* modifies the information providing zone 110 that was set using the host vehicle speed Vv of the host vehicle, the anticipated movement speed Vp of the moving body, the information providing time TTC_A, and the information providing time TTC_B. More specifically, the information providing zone determining section 39*b* modifies the distances A to D shown in FIG. 7 to the distances A' to D' shown in FIG. 8 based on a communication delay time among the portable terminal 1, the information providing server 2, and the onboard apparatus 3, a communication cycle period at which the portable terminal 1 transmits terminal position information to the information providing server 2, a transmission cycle period at which the onboard apparatus 3 transmits host vehicle position information to the information server 2, and errors of the terminal position information and the host vehicle position information resulting from GPS error. It is also acceptable for the information providing zone 110 to be modified using only one of these parameters, or any combination of these parameters.

The delay time for communication among the portable terminal 1, the information providing server 2, and the onboard apparatus 3 is expressed as a maximum communication delay time Dmax (seconds) and a minimum communication delay time Dmin (seconds) stored as constant values in the information storage section 34. A communication cycle period Pp (seconds) of the portable terminal 1, a communication cycle period Pv (seconds) of the onboard apparatus 3, and a GPS error (meters) are also stored in the information storage section 34. The maximum communication delay time Dmax is calculated as a total of the following amounts of time, where each is a maximum anticipated amount of time: an amount of time required for the position identifying section 22 of the portable terminal 1 to acquire a GPS signal transmitted from a GPS satellite (includes a GPS signal acquiring cycle period), an amount of time during which the portable terminal 1 computes the terminal position information, an amount of time during which the terminal position information is transmitted from the portable terminal 1 to the information providing server 2, an amount of time during which the information providing server 2 updates the simple map data 100 using the terminal position information, an amount of time during which the simple map data 102 is transmitted from the information providing server 2 to the onboard apparatus 3, and an amount of time during which the onboard apparatus 3 receives the simple map data 102 and stores it in the information storage section 34. Meanwhile, the minimum communication delay time Dmin is calculated in the same manner as the maximum communication delay time Dmax except that each individual amount of time used to obtain the total is a minimum anticipated amount of time. The maximum communication delay time Dmax and the minimum communication delay time Dmin are each obtained experimentally.

The communication cycle period Pp of the portable terminal 1 is a prescribed amount of time set in advance at the portable terminal 1 and indicates the frequency with which the portable terminal 1 transmits the terminal position information to the information providing server 2. The communication cycle period Pv of the onboard apparatus 3 is a prescribed amount of time set in advance at the onboard apparatus 3 and indicates the frequency with which the onboard apparatus 3 transmits host vehicle position information to the information providing server 2. The GPS error is a difference between the computed value of the terminal position information acquired at the portable terminal 1 and the actual position.

Figure 8:
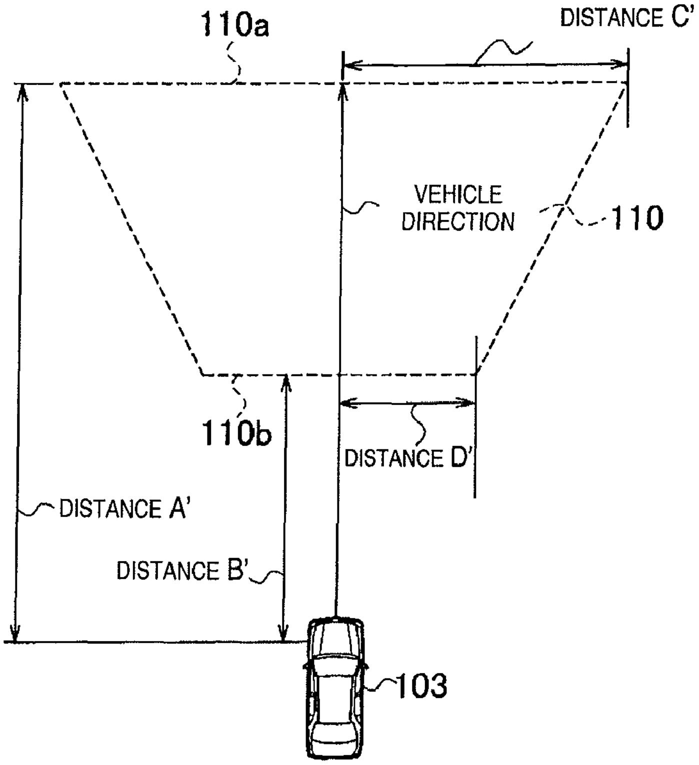
FIG. 8 illustrates how the information providing zone is modified by the onboard apparatus in the information providing system illustrated in FIG. 1.
Figure 9:
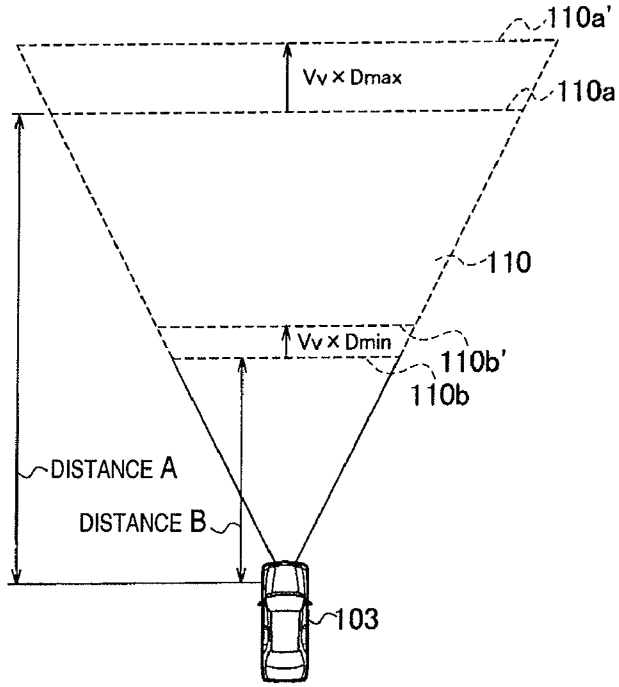
FIG. 9 illustrates how a farthest line and a closest line of the information providing zone are modified based on a maximum communication delay time and a minimum communication delay time by the onboard apparatus in the information providing system illustrated in FIG. 1.

Since the timing at which the existence of a moving body is reported is delayed by an amount of time between the maximum communication delay time Dmax and the minimum communication delay time Dmin, the information providing zone 110 is shifted away from the host vehicle position 103 by amounts corresponding to the maximum communication delay time Dmax and the minimum communication delay time Dmin. The farthest zone distance A' in the advancement direction of the host vehicle shown in FIG. 8 is modified using the maximum communication delay time Dmax to be on the safe side with respect to the communication delay. Thus, as shown in FIG. 9, the farthest line 110*a*' of the information providing zone 110 is set to a position that is farther by an amount equal to the product of the maximum communication delay time Dmax and the host vehicle speed Vv of the host vehicle (Dmax×Vv). Meanwhile, the closest line 110*b*' is modified using the minimum communication delay time Dmin to take into account a communication delay time that is guaranteed to occur. In other words, the closest line 110*b*' is set to a position that is farther by an amount equal to the product of the minimum communication delay time Dmin and the host vehicle speed Vv of the host vehicle (Dmin×Vv).

The communication cycle period Pp of the portable terminal 1 and the communication cycle period Pv of the onboard apparatus 3 do not affect the information providing zone 110 in the advancement direction of the host vehicle because the simple map data 102 held at the onboard apparatus 3 is updated each prescribed cycle period.

Figure 10:
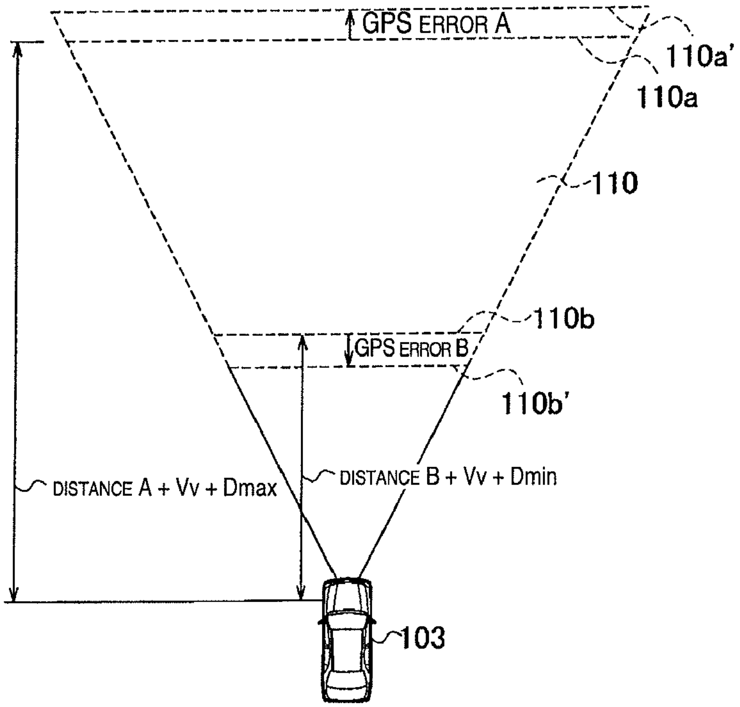
FIG. 10 illustrates how the farthest line and the closest line of an information providing zone are modified based on a GPS error by the onboard apparatus in the information providing system illustrated in FIG. 1.
Figure 11:
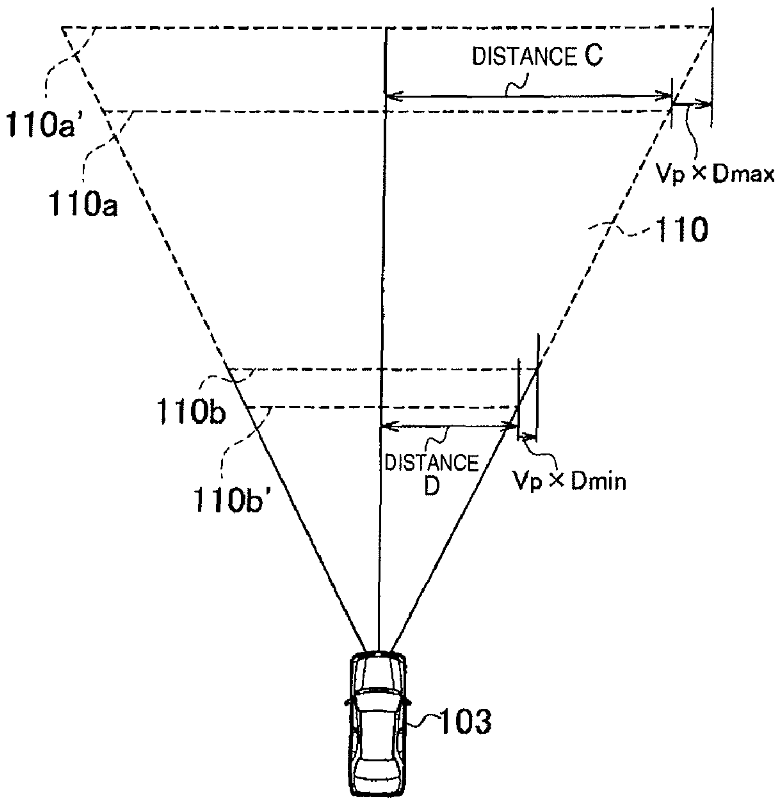
FIG. 11 illustrates how a horizontal width of the information providing zone is modified based on a maximum communication delay time and a minimum communication delay time by the onboard apparatus in the information providing system illustrated in FIG. 1.

The information providing zone determining section 39*b* enlarges the information providing zone 110 in the advancement direction of the host vehicle by an amount corresponding to the GPS error, as shown in FIG. 10. The information providing zone determining section 39*b* accomplishes the enlargement by using the GPS error, the host vehicle speed Vv, the information providing time TTC_A, and the information providing time TTC_B stored in the information storage section 34 in the following equation: GPS error A=GPS error (constant value)−Vv×(TTC_A−TTC_B). The computed value of the GPS error A is only used to modify the information providing zone 110 if it is larger than 0. The information providing zone determining section 39*b* sets the constant GPS error stored in the information storage section 34 as a GPS error B.

As shown in FIG. 10, the information providing zone determining section 39*b* sets a new farthest line 110*a*' in a position shifted from the farthest line 110*a* by the amount of the GPS error A in the advancement direction (i.e., at a position located away from the host vehicle position 103 by a distance equal to the farthest zone distance A+host vehicle speed Vv×maximum communication delay time Dmax) and sets a new closest line 110*b*' in a position shifted from the closest line 110*b* by the amount of the GPS error B in the advancement direction (i.e., at a position located away from the host vehicle position 103 by a distance equal to the closest zone distance B+host vehicle speed Vv×minimum communication delay time Dmin).

Thus, when the communication delay time described previously is taken into account, the farthest zone distance A' from the host vehicle position 103 to the farthest line 110*a*' is given by the following equation:

$$\text{Farthest zone distance } A' = Vv \times (TTC\_A + D\max) + (GPS\ \text{error} - Vv \times (TTC\_A - TTC\_B)).$$

The portion (GPS error−Vv×(TTC_A−TTC_B) is set to zero when the value of (GPS error−Vv×(TTC_A−TTC_B) is smaller than 0.

Meanwhile, the distance B' from the host vehicle position 103 to the closest line 110*b*' is given by the equation below.

$$\text{Closest zone distance } B' = Vv \times (TTC\_B + D\min) - \text{GPS error}$$

Since the farthest line 110*a* is modified to be farther and the closest line 110*b* is modified to be closer so as to enlarge the information providing zone 110 as explained with reference to FIGS. 9 and 10, the information providing zone determining section 39*b* also modifies the width of the information providing zone 110 by lengthening the top base distance C and the bottom base distance D (which are line segments perpendicular to the advancement direction of the host vehicle). The top base distance C is lengthened by the product of the anticipated movement speed Vp of a moving body and the maximum communication delay time Dmax (Vp×Dmax) such that the farthest line 110*a* is modified on both the left and right sides with respect to the advancement direction of the host vehicle. The bottom base distance D is lengthened by the product of the anticipated movement speed Vp of a moving body and the minimum communication delay time Dmin (Vp×Dmin) such that the closest line 110*b* is modified on both the left and right sides with respect to the advancement direction of the host vehicle.

Additionally, since there is a possibility that a moving body will move in a direction perpendicular to the advancement direction of the host vehicle, the information providing zone determining section 39*b* enlarges the information providing zone 110 in a direction perpendicular to the advancement direction of the host vehicle by an amount corresponding to the sum of the communication cycle period Pp of the portable terminal 1 and the communication cycle period Pv of the onboard apparatus 3 (Pp+Pv). The maximum value of the delay resulting from the communication cycle period Pp of the portable terminal 1 and the communication cycle period Pv of the onboard apparatus 3 is the sum of the communication cycle period Pp of the portable terminal 1 and the communication cycle period Pv of the onboard apparatus 3. The maximum value is used as a constant value to be on the safe side regarding the effect on the information providing zone 110.

Figure 12:
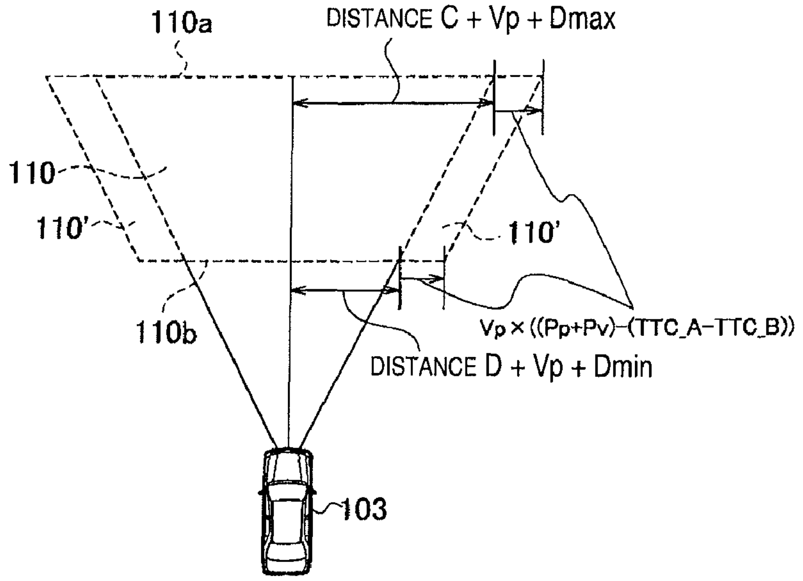
FIG. 12 illustrates how a horizontal width of the information providing zone is modified based on a communication cycle period of a portable terminal and a communication cycle period of the onboard apparatus by the onboard apparatus in the information providing system illustrated in FIG. 1.
Figure 13:
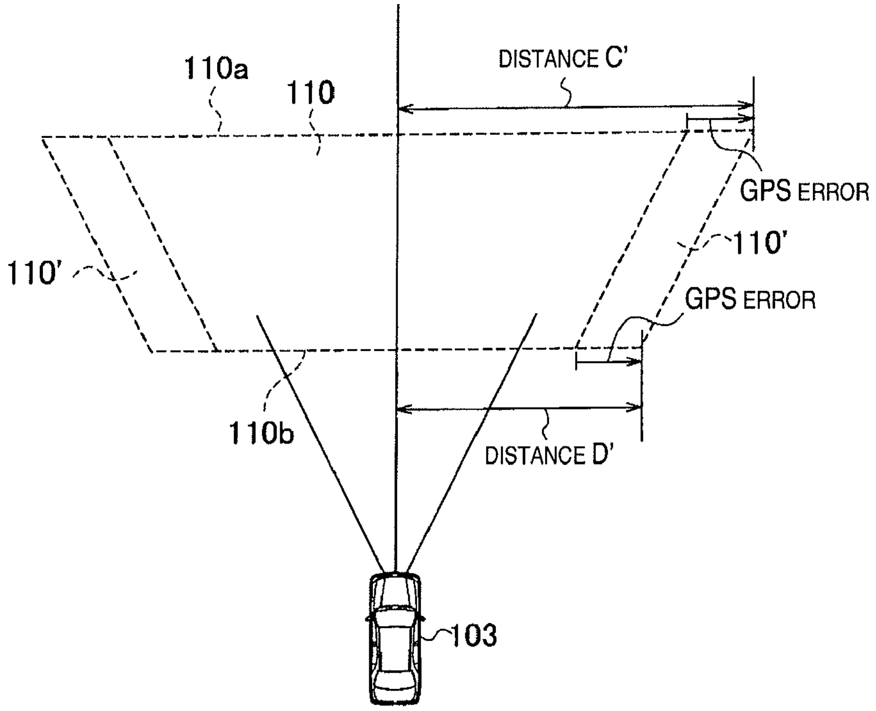
FIG. 13 illustrates how a horizontal width of the information providing zone is modified based on a GPS error by the onboard apparatus in the information providing system illustrated in FIG. 1.

Thus, the information providing zone determining section 39*b* enlarges the information providing zone 110 in a direction perpendicular to the advancement direction of the host vehicle based on the communication cycle period Pp of the portable terminal 1 and the communication cycle period Pv of the onboard apparatus 3 as shown in FIG. 12 and modifies the width of the information providing zone 110 based on the GPS error to obtain the information providing zone 110' shown in FIG. 13. If the amount of time obtained by adding the communication cycle period Pp of the portable terminal 1 and the anticipated movement speed Vp of a moving body is between the information providing time TTC_A and the information providing time TTC_B, then there is not effect on the information providing zone 110. More specifically, if the length Vp×((Pp+Pv)−(TTC_A−TTC_B)) by which the information providing zone 110 is enlarged is larger than 0, then the information providing zone determining section 39*b* enlarges the information providing zone 110 by lengthening the top base distance C and the bottom base distance D.

The modified top base distance C' and the bottom base distance D are given by the equations below.

$$\text{Top base distance } C'=Vp\times(TTC\_A+D\text{max}+(Pp+Pv-(TTC\_A-TTC\_B)))+\text{GPS error}$$

$$\text{Bottom base distance } D'=Vp\times(TTC\_B+D\text{min}+(Pp+Pv-(TTC\_A-TTC\_B)))+\text{GPS error}$$

Regarding both the top base distance C' and the bottom base distance D', if the quantity ((Pp+Pv)−(TTC_A−TTC_B)) is smaller than 0, then the value of ((Pp+Pv)−(TTC_A−TTC_B)) is set to 0 and the information providing zone 110 is not modified.

In this way, by executing step S8, the information providing zone determining section 39*b* can modify the information providing zone 110 in a manner that takes into account parameters that affect the timing at which information is provided, namely, the communication delay time, the communication cycle period of the portable terminal 1, the communication cycle period of the onboard apparatus 3, and the GPS error. Furthermore, the information providing zone 110 can be modified based on only a portion of these parameters by excluding the parameters that will not be used from the equations shown above.

Figure 14:
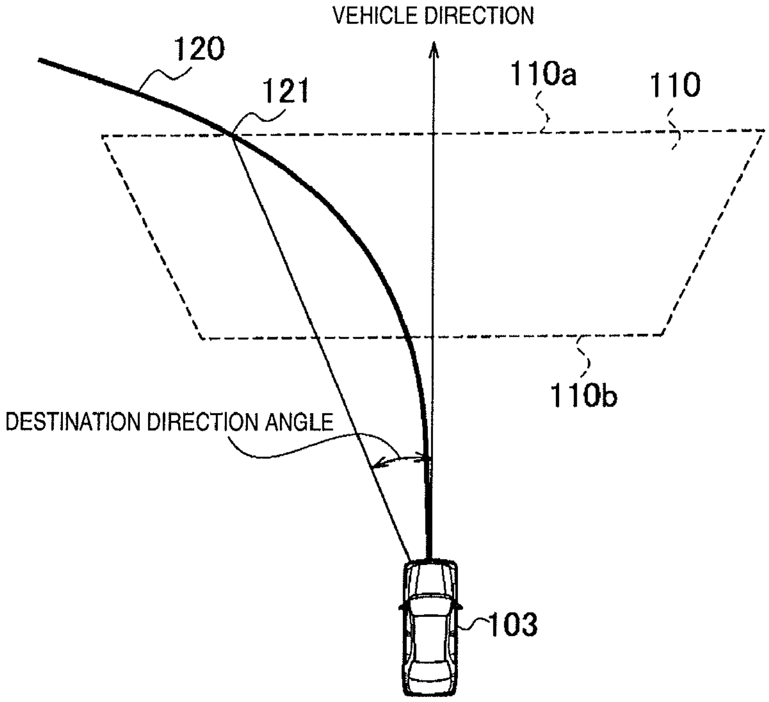
FIG. 14 illustrates a positional relationship between the information providing zone and a curved road in the information providing system illustrated in FIG. 1.

In step S9, the information providing zone determining section 39*b* detects a curvature of the portion of the road on which the host vehicle is traveling that lies within the information providing zone 110 by referring to the information providing region 110 set in step S8 and the detailed map data stored in the road map storage section 33. For example, as shown in FIG. 14, if the road is curved so as to intersect both the closest line 110*b* and the farthest line 110*a* and the curvature corresponds to a destination direction angle lying between the current advancement direction of the host vehicle and a direction pointing toward an advancement destination of the host vehicle, then the destination direction angle is calculated using a line segment joining the host vehicle position 103 to a point 121 where a road link 120 intersects the farthest line 110*a* of the information providing zone 110. If, as shown in FIG. 15, the road length 120 intersects the farthest line 110*a* of the information providing zone 110 at a position outside the information providing zone 110, then the destination direction angle is assumed to be infinity (∞).

Figure 15:
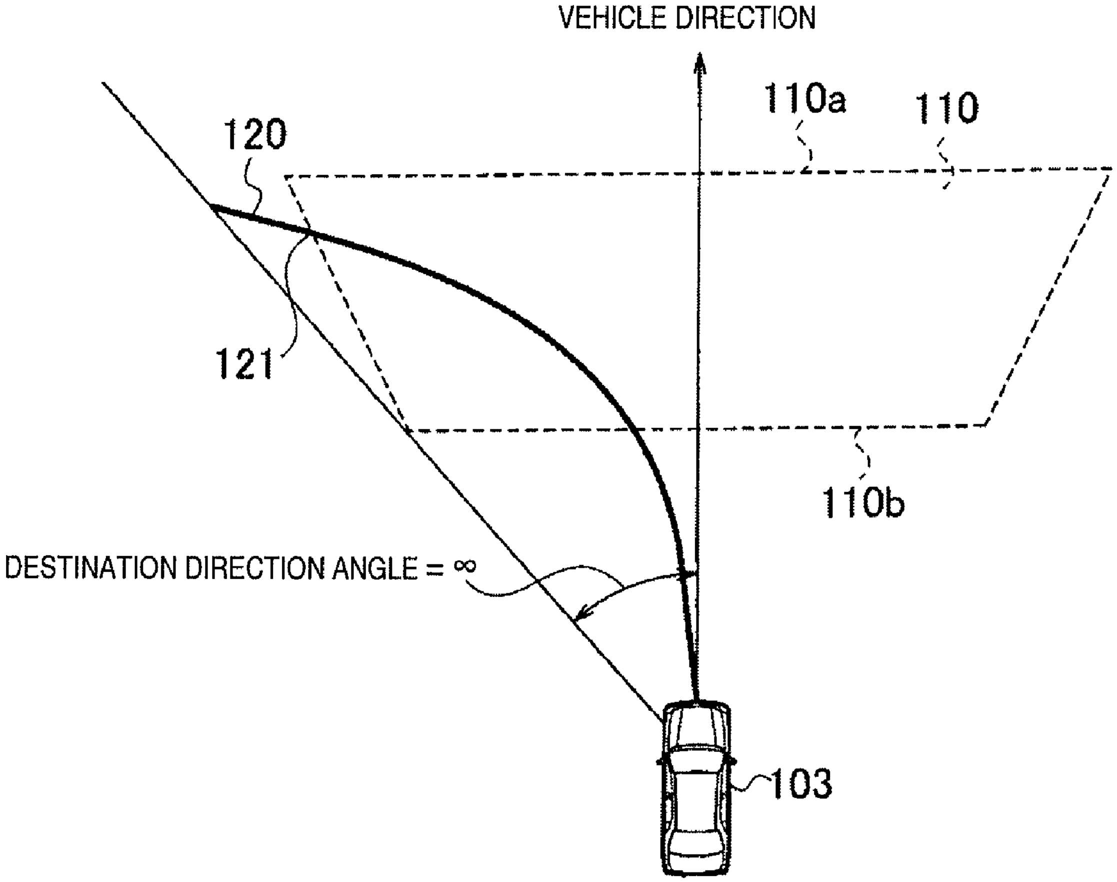
FIG. 15 illustrates another positional relationship between an information providing zone and a curved road in the information providing system illustrated in FIG. 1.

In step S10, the information providing zone determining section 39*b* determines if the destination direction angle calculated in step S9 is infinity, i.e., if the road is curved with a large curvature as shown in FIG. 15. If the destination direction angle is infinity (∞), then the information providing zone determining section 39*b* ends the control sequence, thereby stopping the process of setting the information providing zone 110 and the process of reporting the existence of a moving body. Meanwhile, if destination direction angle is not infinity (∞), then the information providing zone determining section 39*b* proceeds to step S11.

In step S11, the information providing zone determining section 39*b* determines if the destination direction angle found in step S9 is larger than a preset maximum angle (prescribed value). The maximum angle is set in advance to a value in a range where the information providing zone 110 can be tilted and reset, as will be explained later. If the destination direction angle is smaller than the maximum angle and the curvature of the road is small, then the information providing zone determining section 39*b* proceeds to step S12. Meanwhile, if the destination direction angle is larger than the maximum angle and the curvature of the road is large, then the information providing zone determining section 39*b* proceeds to step S13 without modifying the information providing zone 110 based on the curvature of the road on which the host vehicle is traveling.

Figure 16:
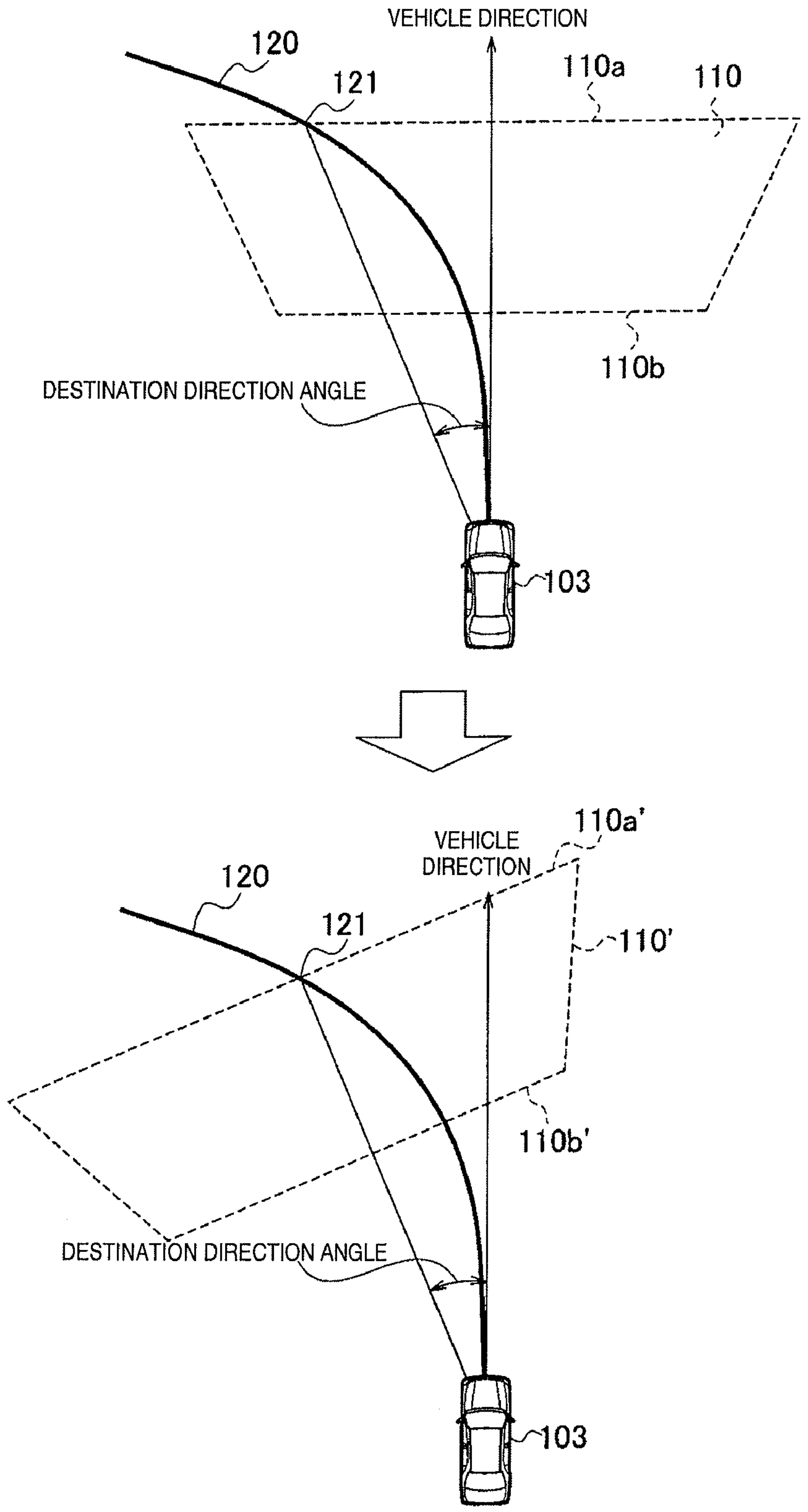
FIG. 16 illustrates how the information providing zone is modified based on a curvature of a curved road by the onboard apparatus in the information providing system illustrated in FIG. 1.

In step S12, the information providing zone determining section 39*b* modifies the information providing zone 110 with respect to the advancement direction of the host vehicle based on the size of the destination direction angle calculated in step S9. More specifically, when the host vehicle enters a curve in the road, as indicated with the road link 120 in the top part of FIG. 16, the information providing zone determining section 39*b* rotates the information providing zone 110 such that the farthest line 110*a* and the closest line 110*b* intersect perpendicularly with a line segment joining the host vehicle position 103 and the point 121 where the road link 120 intersects the farthest line 110*a* of the information providing zone 110, thereby setting an information providing zone 110' having a new farthest line 110a' and a new closest line 110b' and centered on said line segment.

Figure 17:
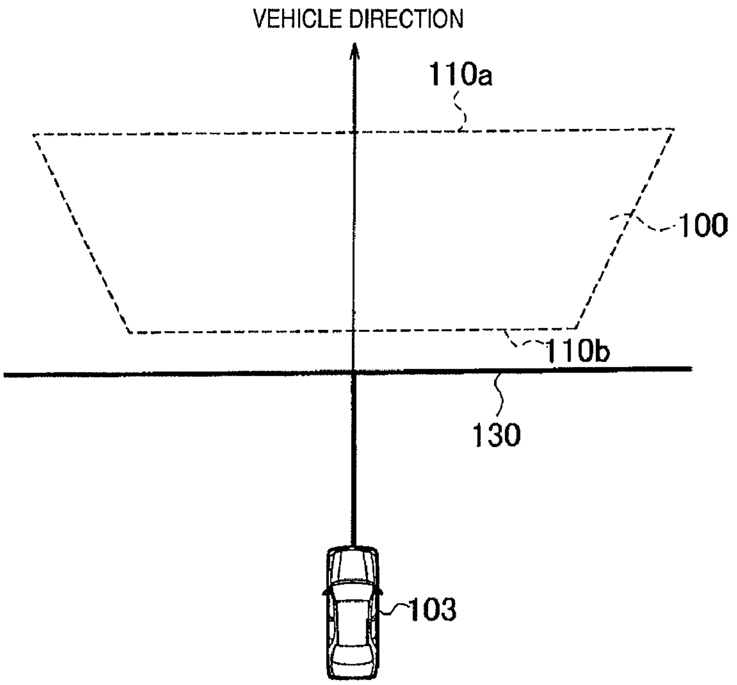
FIG. 17 illustrates a positional relationship between the information providing zone and a T intersection in the information providing system illustrated in FIG. 1.
Figure 18:
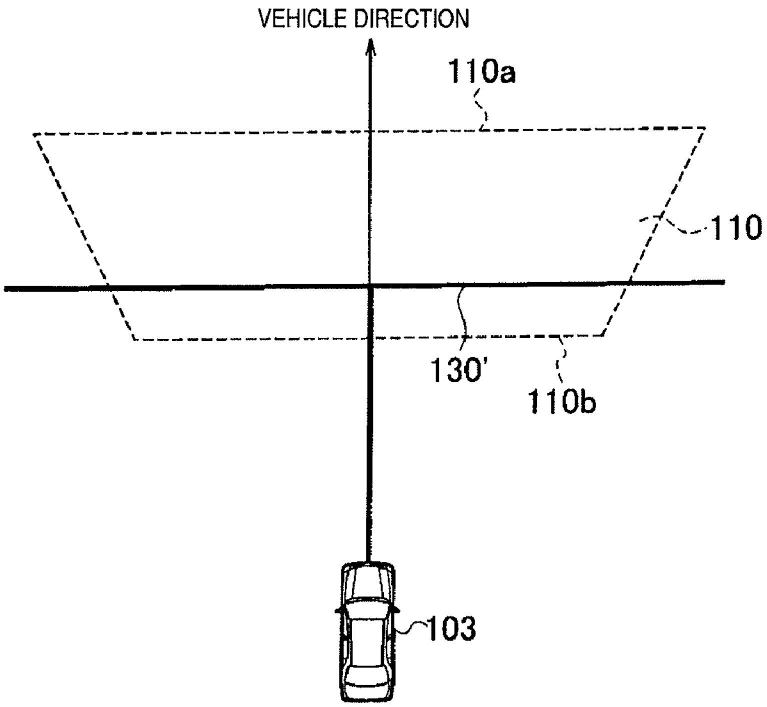
FIG. 18 illustrates another positional relationship between the information providing zone and a T intersection in the information providing system illustrated in FIG. 1.

In step S13, the information providing zone determining section 39b determines if a T intersection 130 requiring the host vehicle to turn right or turn left exists immediately ahead in the advancement direction of the host vehicle by referring to the information providing zone 110 and the detailed map data stored in the road map storage section 33. For example, if, as shown in FIG. 17, a T intersection 130 exists between the host vehicle position 103 and the information providing zone 110, i.e., a T intersection 130 exists in a position closer to the host vehicle position 103 than the closest line 110b, then the information providing zone determining section 39b determines that the T intersection 130 exists immediately ahead in the advancement direction of the host vehicle and ends the control sequence, thereby stopping the process of setting the information providing zone 110 and the process of reporting the existence of a moving body.

In step S14, the information providing zone determining section 39b determines if a T intersection 130' exists in front of the host vehicle within the information providing zone 110 by referring to the information providing zone 110 and the detailed map data stored in the road map storage section 33. If the T intersection 130' exists, then the information providing zone determining section 39b proceeds to step S15 and modifies the information providing zone 110. If a T intersection 130' does not exist, the information providing zone determining section 39b proceeds to step S16 without modifying the information providing zone 110.

Figure 19:
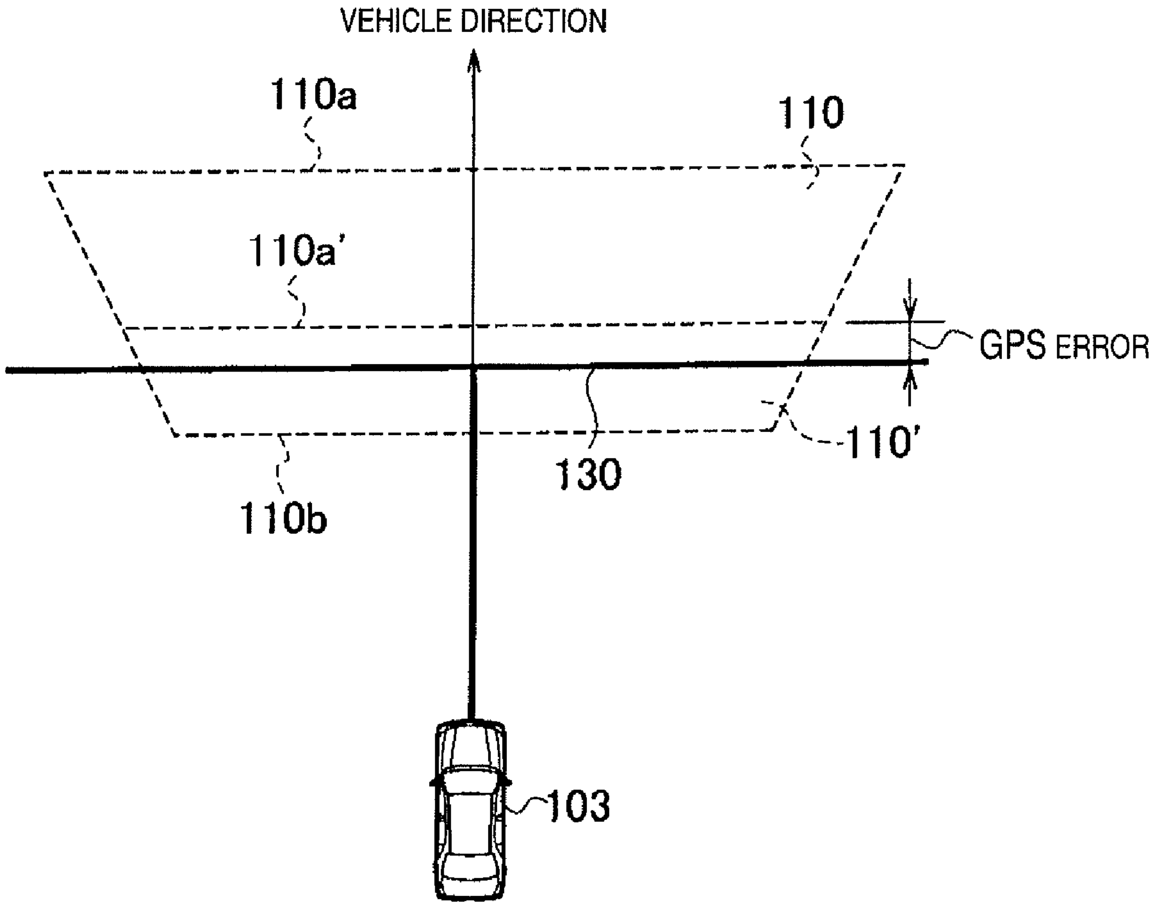
FIG. 19 illustrates how the information providing zone is modified by the onboard apparatus based on a shape of a road on which the vehicle is traveling in the information providing system illustrated in FIG. 1.

In step S15, the information providing zone determining section 39b excludes the portion of the information providing zone 110 that is farther from the host vehicle position 103 than the T intersection 130. In short, when an intersection exists in a movement direction of the host vehicle, the information providing zone determining section 39a sets the information providing zone 110 such that it excludes a zone in which a road does not branch from the intersection. For example, as shown in FIG. 19, the trapezoidal shape of the information providing zone 110 is modified by moving the farthest line 110a to the position of a farthest line 110a' that is closer to the host vehicle position 103 and generally parallel to the road link that is perpendicular to the road link on which the host vehicle is traveling. In this embodiment, the trapezoidal shape of the information providing zone 110 is modified such that the distance between the farthest line 110a' and the road link that is perpendicular to the road link on which the host vehicle is traveling equal to the GPS error used as a parameter for setting the information providing zone 110 in step S8.

In step S16, the information providing control section 39c reads the simple map data 102, which is stored in the information storage section 34 and constitutes information expressing the distribution of the portable terminals 1. Separately from the processing shown in FIG. 6, computer processing configured to update the simple map data 102 by receiving new simple map data 102 from the information providing server 2 and storing it in the information storage section 34 is executed in response to a transmission of host vehicle position information to the information providing server 2. In other words, the simple map data 102 is not used only when it is received. Rather, the simple map information 102 is stored in the information storage section 34 and the same simple map information 102 is used until a new set of simple map data 102 is received.

In step S17, the information providing control section 39c compares the notification necessary regions 101b of the simple map data 102 read in step S16 and the information providing zone 110 set as described previously. If the comparison indicates that a notification necessary region 101b overlaps with the information providing zone 110, then the information providing control section 39c determines that the existence of a moving body should be reported with the information providing section 38. Even if only a portion of the notification necessary regions 101b overlap with the information providing zone 110, as shown in FIG. 5, it is preferable for the system to report the existence of a moving body.

As shown in FIG. 6, the onboard apparatus 3 sets an information providing zone 110 and determines if a state exists in which the existence of a moving body can be reported in steps S1 to S7 and modifies the information providing zone 110 in steps S8 to S15. Then, if it determines in step S16 that a notification necessary region 101b exists inside the information providing zone 110, then in step S17 it determines that the existence of a moving body should be reported and reports the moving body with the information providing section 38.

As described in detail previously, the onboard apparatus 3 sets the information providing zone 110 based on an advancement speed and an advancement direction of the host vehicle in which the onboard apparatus 3 is installed, a prescribed farthest zone distance and shortest distance from the host vehicle that define an information providing zone in which an existence of a moving body should be reported, and a prescribed movement speed of a moving body. Since the onboard apparatus 3 can determine if it is necessary to report the existence of a moving body by simply determining if a terminal position information overlaps with the information providing zone 110, the computer processing load born onboard the host vehicle in order to report information regarding a moving body can be reduced. More specifically, with the onboard apparatus 3, it is not necessary to compute the relative positional relationships between the host vehicle position information and the terminal position information of each portable terminal and, thus, the computer processing load does not increase in accordance with the number of moving bodies existing in the vicinity of the host vehicle. As a result, the computer processing load born onboard the host vehicle in order to report the existence of a moving body can be reduced.

Additionally, this onboard apparatus 3 is configured to set a shortest distance from the host vehicle position 103 to the information providing zone 110 such that moving bodies existing in close proximity to the host vehicle 103 can be excluded from the notification processing. As a result, the computer processing load is further reduced and the reliability of the notification function can be improved.

With this onboard apparatus 3, the computer processing load can be reduced even further because the existence of a moving body can be reported by merely determining if a notification necessary region 101b of a set of simple map data 102 that has been divided into unit regions 101 overlaps with the information providing zone 110.

This onboard apparatus 3 is configured to modify the information providing zone 110 based on a communication delay time occurring between the portable terminal 1 and the information providing server 2 and a communication delay time occurring between the information providing server 2 and the onboard apparatus 3. Consequently, if a moving body moves into a zone where the moving body should be reported during the delay time, the moving body can be reported reliably if there is a possibility that the moving body will cross paths with the host vehicle. Thus, the reliability of the system can be improved because the existence of any moving body existing inside the information providing zone 110 can be reported in a reliable fashion.

Since the onboard apparatus 3 is configured to modify the information providing zone 110 based on a prescribed communication cycle period at which it transmits host vehicle position information to the information providing server 2, any actual delay that occurs due to the cycle period at which the host vehicle position information is transmitted can be reflected in the information providing zone 110. As a result, with the onboard apparatus 3, if a moving body moves into a zone where the moving body should be reported during the delay time, the moving body can be reported reliably if there is a possibility that the moving body will cross paths with the host vehicle. Thus, the reliability of the system can be improved because the existence of any moving body existing inside the information providing zone 110 can be reported in a reliable fashion.

Since the onboard apparatus 3 is configured to modify the information providing zone 110 based on a prescribed communication cycle period at which a portable terminal 1 transmits terminal position information to the information providing server 2, any actual delay that occurs due to the cycle period at which the terminal position information is transmitted can be reflected in the information providing zone 110. As a result, with the onboard apparatus 3, if a moving body moves into a zone where the moving body should be reported during the delay time, the moving body can be reported reliably if there is a possibility that the moving body will cross paths with the host vehicle. Thus, the reliability of the system can be improved because the existence of any moving body existing inside the information providing zone 110 can be reported in a reliable fashion.

Since the onboard apparatus 3 is configured to modify the information providing zone 110 based on an error of the position information of the host vehicle acquired by the onboard apparatus 3 and an error of the terminal position information acquired by the portable terminal 1, the GPS error can be taken into account in the information providing zone 110 and incorrect determinations that a moving body has not entered the information providing zone 110 resulting from GPS error can be prevented. As a result, the reliability of the system can be improved because the existence of any moving body existing inside the information providing zone 110 can be reported in a reliable fashion.

With the onboard apparatus 3, when an intersection exists in a movement direction of the host vehicle, the information providing zone 110 is set such that the portion in which a road does not branch from the intersection is excluded. As a result, the existence of a moving body existing in a place where there is no possibility that the moving body will cross paths with the host vehicle is not reported and the reliability of the notification function can be improved.

The onboard apparatus 3 is configured to stop the process of setting the information providing zone 110 when a T intersection at which the host vehicle will have to turn right or left exists in the advancement direction of the host vehicle and the host vehicle has drawn near the T intersection. As a result, reporting the existence of a moving body can be avoided when it is highly likely that the host vehicle will slow down for a right or left turn and the reliability of the notification function can be improved.

The onboard apparatus 3 is contrived such that when a curved road exists in the advancement direction of the host vehicle, the information providing zone 110 is set based on a curvature of the road such that the information providing zone 110 is tilted in a direction that includes the curved road. By modifying the information providing zone 110 based on the curved road, information regarding a moving body that could possibly cross paths with the host vehicle can be reported accurately and the reliability of the notification function can be improved.

The onboard apparatus 3 is configured to stop the process of setting the information providing zone 110 when a curvature of a curved road on which the host vehicle is traveling is larger than a prescribed value. As a result, unnecessary reports of the existence of moving bodies can be prevented and the reliability of the notification function can be improved.

The onboard apparatus 3 is configured to stop the process of setting the information providing zone 110 when the host vehicle is traveling on an expressway, a bypass, or other type of road where moving bodies do not exist. As a result, reporting of the existence of moving bodies is not executed when there is no possibility of a moving body crossing paths with the host vehicle and the reliability of the notification function can be improved.

The onboard apparatus 3 is configured to stop the process of setting the information providing zone 110 when a driving operation for stopping the host vehicle is detected. Thus, reporting of the existence of moving bodies is not executed when the host vehicle is traveling in, for example, a store parking lot and there is no possibility of a moving body crossing paths with the host vehicle. As a result, the reliability of the notification function can be improved.

The onboard apparatus 3 is configured to stop the process of setting the information providing zone 110 when a driving operation (turns signal or steering angle) for turning the host vehicle right or left is detected. Thus, reporting of the existence of moving bodies is not executed when there is a possibility that reporting a moving body would distract the driver. As a result, the reliability of the notification function can be improved.

The onboard apparatus 3 is configured to stop the process of setting the information providing zone 110 when a driving operation changing a shift position of the host vehicle to a reverse position or a park position is detected. As a result, unnecessary reports of the existence of moving bodies can be prevented and the reliability of the notification function can be improved.

The onboard apparatus 3 is configured to stop the process of setting the information providing zone 110 when the speed of the host vehicle is equal to or below a prescribed value. As a result, unnecessary reports of the existence of moving bodies can be prevented and the reliability of the notification function can be improved.

The onboard apparatus 3 is configured to stop the process of setting the information providing zone 110 for a prescribed amount of time after the existence of a moving body has been reported. In this way, the degree to which frequent reports becomes an annoyance to the driver can be reduced.

The onboard apparatus 3 is configured to stop the process of setting the information providing zone 110 when the number of times the existence of a moving body has been reported since the host vehicle started moving and before the host vehicle has stopped exceeds a prescribed value. As a result, the degree to which frequent reports becomes an annoyance to the driver can be reduced.

With the onboard apparatus 3, the simple map data received from the information providing server 2 is stored in the information storage section 34. Thus, a determination as to whether the existence of a moving body should be reported can be made each time the control sequence shown in FIG. 6 is executed even if the cycle period at which the simple map data 102 is received from the information providing server 2 is different from the cycle period at which the necessity of reporting a moving body is determined in the control sequence of FIG. 6.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An onboard vehicle information notifying apparatus comprising:

a moving body position acquiring section configured to acquire a moving body position for at least one moving body existing in a vicinity of a host vehicle equipped with the vehicle information notifying apparatus;

an information acquiring section configured to acquire an advancement speed and an advancement direction of the host vehicle, and a prescribed movement speed of the moving body;

an information providing zone setting section configured to set an information providing zone within which existence of the moving body should be reported, based on information acquired by the information acquiring section;

an information notifying section configured to report the existence of the moving body when the position of the moving body acquired by the moving body position acquiring section exists within the information providing zone set by the information providing zone setting section; and a host vehicle position acquiring section configured to acquire vehicle position information indicating a position of the host vehicle, the moving body position acquiring section being configured to send the host vehicle position information acquired by the host vehicle position acquiring section to a remote information providing apparatus to acquire map information containing the position of the host vehicle and terminal position information transmitted from the moving body from the information providing apparatus, which created the map information.

2. The onboard vehicle information notifying apparatus as recited in claim 1, wherein the moving body position acquiring section is further configured to acquire map information of the vicinity of the host vehicle, the map information being divided into a plurality of unit regions, with each of the unit regions being indicated as a notification necessary region when the moving body exists in the unit region; and the information notifying section is further configured to report the existence of the moving body when the information providing zone set by the information providing zone setting section overlaps with the notification necessary region acquired by the moving body position acquiring section.

3. The onboard vehicle information notifying apparatus as recited in claim 1, wherein the information providing zone setting section is configured to modify the information providing zone based on at least one of a communication delay time that occurs between a terminal of the moving body terminal and the remote information providing apparatus when the moving body position acquiring section acquires the map information, and a communication delay time that occurs between the moving body position acquiring section and the information providing apparatus.

4. The onboard vehicle information notifying apparatus as recited in claim 1, wherein the information providing zone setting section is configured to modify the information providing zone based on a communication cycle period at which the host vehicle position acquiring section sends the acquired information indicating the position of the host vehicle.

5. The onboard vehicle information notifying apparatus as recited in claim 1, wherein the information providing zone setting section is configured to modify the information providing zone based on a communication cycle period at which the information providing apparatus acquires information indicating the position of the moving body once for each of the communication cycle period.

6. The onboard vehicle information notifying apparatus as recited in claim 1, wherein the information providing zone setting section is configured to modify the information providing zone based on at least one of an error of the information indicating the position of the host vehicle acquired by the host vehicle position acquiring section, and an error of the information indicating the position of the moving body.

7. The onboard vehicle information notifying apparatus as recited in claim 1, wherein the information providing zone setting section is configured to set the information providing zone to exclude a zone in which a road does not branch from an intersection, upon determining the intersection exists in the advancement direction of the host vehicle.

8. The onboard vehicle information notifying apparatus as recited in claim 1, wherein the information providing zone setting section sets the information providing zone based on a curvature of a curved road such that the information providing zone is angled with respect to the advancement direction of the host vehicle, upon determining the curved road exists in the advancement direction of the host vehicle, such that the curved road is included in the information providing zone.

9. The onboard vehicle information notifying apparatus as recited in claim 1, wherein the information providing zone setting section is configured to stop setting the information providing zone upon determining a T intersection exists in the advancement direction of the host vehicle at which the host vehicle will have to turn right or left and the host vehicle has drawn near to the T intersection.

10. The onboard vehicle information notifying apparatus as recited in claim 1, wherein the information providing zone setting section is configured to stop setting the information providing zone upon determining a curved road exists in the advancement direction of the host vehicle and a curvature of the curved road is larger than a prescribed value.

11. The onboard vehicle information notifying apparatus as recited in claim 1, wherein the information providing zone setting section is configured to stop setting the information providing zone upon determining the host vehicle is traveling on a road on which a moving body does not exist.

12. The onboard vehicle information notifying apparatus as recited in claim 1, wherein the information providing zone setting section is configured to stop setting the information providing zone upon determining a driving operation exists for stopping the host vehicle.

13. The onboard vehicle information notifying apparatus as recited in claim 1, wherein the information providing zone setting section is configured to stop setting the information providing zone upon determining a driving operation for turning the host vehicle right or left.

14. The onboard vehicle information notifying apparatus as recited in claim 1, wherein the information providing zone setting section is configured to stop setting the information providing zone upon determining a driving operation that puts a shift position of the host vehicle into a reverse position or a park position.

15. The onboard vehicle information notifying apparatus as recited in claim 1, wherein the information providing zone setting section is configured to stop setting the information providing zone upon determining a speed of the host vehicle is equal to or below a prescribed value.

16. The onboard vehicle information notifying apparatus as recited in claim 1, wherein the information providing zone setting section is configured to stop setting the information providing zone upon determining the information notifying section has reported that the moving body exists and that a prescribed amount of time has not elapsed since reporting the existence of the moving body.

17. The onboard vehicle information notifying apparatus as recited in claim 1, wherein the information providing zone setting section is configured to stop setting the information providing zone upon determining a number of times the information notifying section has reported the existence of the moving body since the host vehicle started moving and before the host vehicle has stopped exceeds a prescribed value.

18. A vehicle information notifying system comprising:

an onboard vehicle information notifying apparatus; and an information providing apparatus including a communication device configured to exchange information between the onboard vehicle information notifying apparatus and a moving body terminal possessed by a moving body;

a map creating device configured to use information indicating a position of the moving body terminal received from the moving body terminal and create map information that is divided into a plurality of unit regions, with each of the unit regions being indicated as a notification necessary region when the moving body exists in the unit region; and a transmission control device configured to transmit at least portions of the map information indicative of the position of the moving body terminal to the onboard vehicle information notifying apparatus using the communication device, and the onboard vehicle information notifying apparatus including an information acquiring section configured to acquire an advancement speed and an advancement direction of the host vehicle, and a prescribed movement speed of the moving body;

an information providing zone setting section configured to set an information providing zone within which existence of the moving body should be reported, based on information acquired by the information acquiring section;

a moving body position acquiring section configured to acquire the position of the moving body existing in a vicinity of the host vehicle by referring to the map information sent from the information providing apparatus;

an information notifying section configured to report the existence of the moving body when the information providing zone set by the information providing zone setting section overlaps with the notification necessary region acquired by the moving body position acquiring section.

* * * * *